Sept. 13, 1966    D. M. BURNS    3,272,553
SAFEGUARD FOR CHILD'S SEAT
Filed March 18, 1965    2 Sheets-Sheet 1

INVENTOR
DENNIS M. BURNS
BY Cushman, Darby & Cushman
ATTORNEY

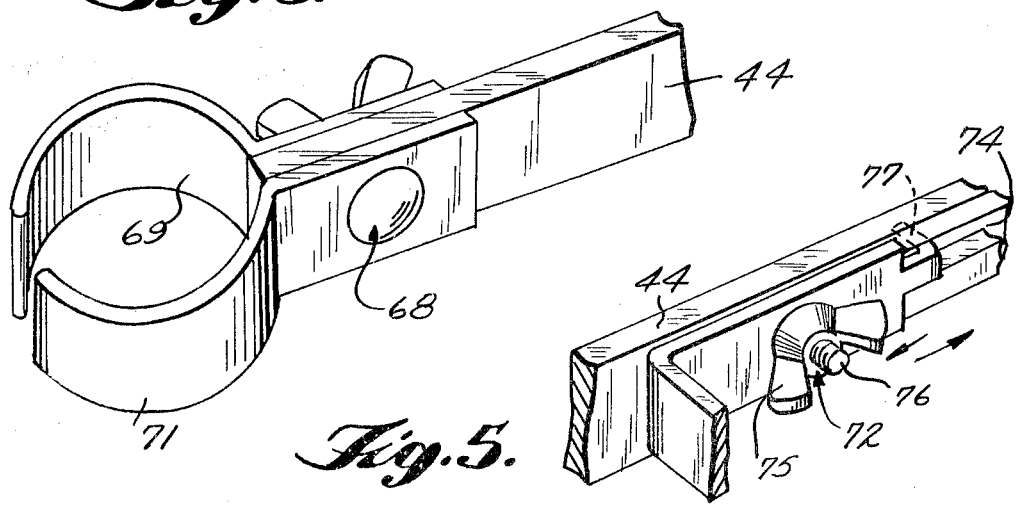
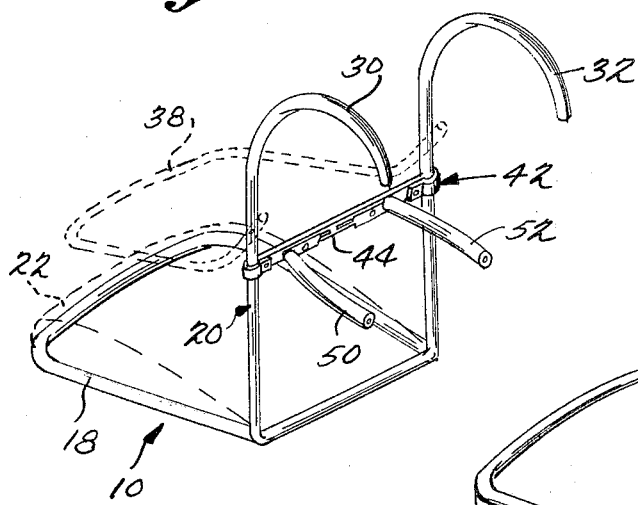
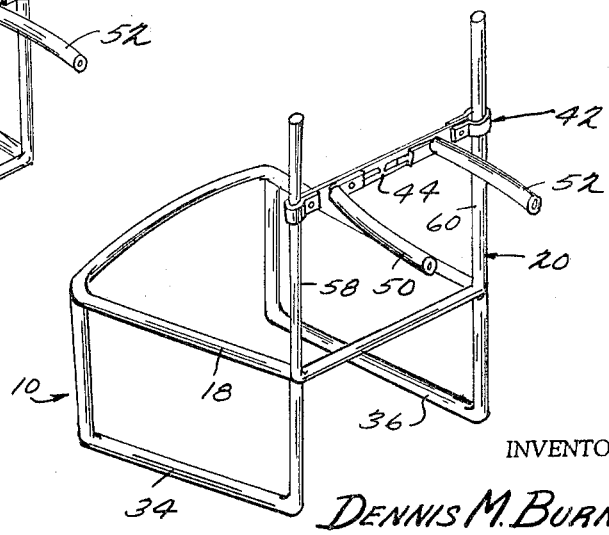

United States Patent Office 3,272,553
Patented Sept. 13, 1966

3,272,553
SAFEGUARD FOR CHILD'S SEAT
Dennis M. Burns, 143 Silver St., Dover, N.H.
Filed Mar. 18, 1965, Ser. No. 440,819
6 Claims. (Cl. 297—254)

This invention relates to a child's seat for use in an automobile and is particularly concerned with an auxiliary child's seat which may be fitted to and carried by two adjoining bucket type seats in an automobile.

Prior art seats for children have been constructed and designed to be supported or suspended on the front seat of an automobile where the automobile has a single, bench-type front seat. Such prior art seats for chlidren are portable in nature and usually include some means for supporting or suspending the child's seat between two pasengers riding in the front seat position of the automobile. The support means may include spaced leg elements which are placed on the bottom horizontal portion of the front seat so as to elevate the child's seat to a suitable height. Alternatively, the child's seat may be suspended with spaced hook-shaped means which are placed over the back of the automobile seat so as to suspend the child's seat at a desired elevation.

Modern automobiles are commonly constructed with two separate front seats which adjoin one another but which are spaced from one another, and these separate front seat arrangements are referred to as bucket seats. Although bucket seats are designed to carry only a single passenger in each seat, the front bucket seats in an automobile are so spaced from each other that it is possible to place a child's auxiliary seat in a straddling or bridging relationship between the two bucket seats. When the conventional child's seat is used in an automobile having bucket seats, the usual spaced support means or spaced suspension means of the child's seat are placed on opposed edge portions of the two adjoining bucket seats. However, it can be appreciated that when a child's seat is bridged between spaced bucket seats there is the danger of a lateral shifting which would cause one side of the child's seat to tip or fall into the space between the bucket seats. This problem arises especially in the case of auxiliary seats which are suspended by spaced hook devices which embrace the separate backs of the two bucket seats. In such a suspension arrangement, lateral movement of the child's seat results in a sliding of one of the hook members into the space between the bucket seats, and the child's seat and its occupant is then tilted into an unstable position which may be unsafe for both the driver and the child.

Attempts have been made to overcome the problems and disadvantages described above and such attempts have included either a reconstruction of the child's seat to exactly fit the space between bucket seats or a substantial modification of existing automobile bucket seats so as to attach the child's seat in a fixed position. However, these prior art attempts have been unsatisfactory because of the costs involved in reconstructing or modifying to custom requirements. Furthermore, the seats, as reconstructed or modified, do not permit a child's seat to be adapted to varying sizes of spaces found between bucket seats in different models of automobiles, and the prior art constructions cannot be used interchangeably with bench seat vehicles as well as bucket seat vehicles.

The present invention overcomes the prior art disadvantages by including in a child's seat construction an adapter means which allows existing seats for children to be safely carried in a bridging relationship with bucket type seats in an automobile. The adapter means includes one or more finger elements which may be inserted between adjoining bucket seats so as to prevent lateral shifting of the child's seat. The adapter means is of such a construction that it may be formed integrally with a child's seat, or formed separately to be added to existing child seat constructions. Additionally, the adapter means of this invention does not affect the desired portability of the child's seat and permits an easy installation or removal of the child's seat in an automobile. Also, the adapter means is constructed to permit the adapter itself, or alternatively the finger elements of the adapter, to be removed so that the child's seat may be interchangeably used with automobiles having bench seats or bucket seats.

A preferred embodiment of a child's seat constructed in accordance with this invention includes the usual horizontal base portion together with a vertical back support. Attachment means for suspending the child's seat are connected to its vertical back support, and these attachment means may comprise spaced inverted U-shaped elements which are of such a size and shape as to permit the child's seat to be suspended from the upright backs of the two bucket seats. The child's seat also includes an adapter means connected therewith and which is fitted in the space between the two bucket seats, and this adapter means prevents any lateral shifting when the child's seat is suspended from the bucket seats in a bridging relationship over the two bucket seats. The adapter means preferably includes two finger elements which are spaced apart and adjustable toward and away from each other so that they can be made to firmly contact the opposing edges of the two adjoining bucket seats. In this manner the child's seat with its adapter means may be fitted to any size of space between bucket seats in an automobile, and the child's seat is prevented from laterally shifting or dislodging from its suspended bridging position between the two seats.

The adapter means carried by the child's seat of this invention is easily constructed and easily adjusted to any existing automobile with bucket seats. In use, the child's seat of this invention is safer and is more easily mounted and demounted from an automobile than prior art auxiliary seats.

Other advantages in the construction and use of the child's seat of this invention will become apparent in the detailed discussion which follows.

For a better understanding of the detailed discussion, reference will be made to the accompanying drawings in which:

FIGURE 2 is a perspective view of the adapter means mounted in an alternative position on a child's seat frame;

FIGURE 3 is a perspective view of an alternative type of child's seat frame with the adapter means mounted on it;

FIGURE 5 is a detail of a finger element adjustably mounted on a cross bar of the adapter means; and FIGURE 6 is a detail of an alternative clamping means for use on the terminal ends of the cross bar of the adapter means.

Figure 1:
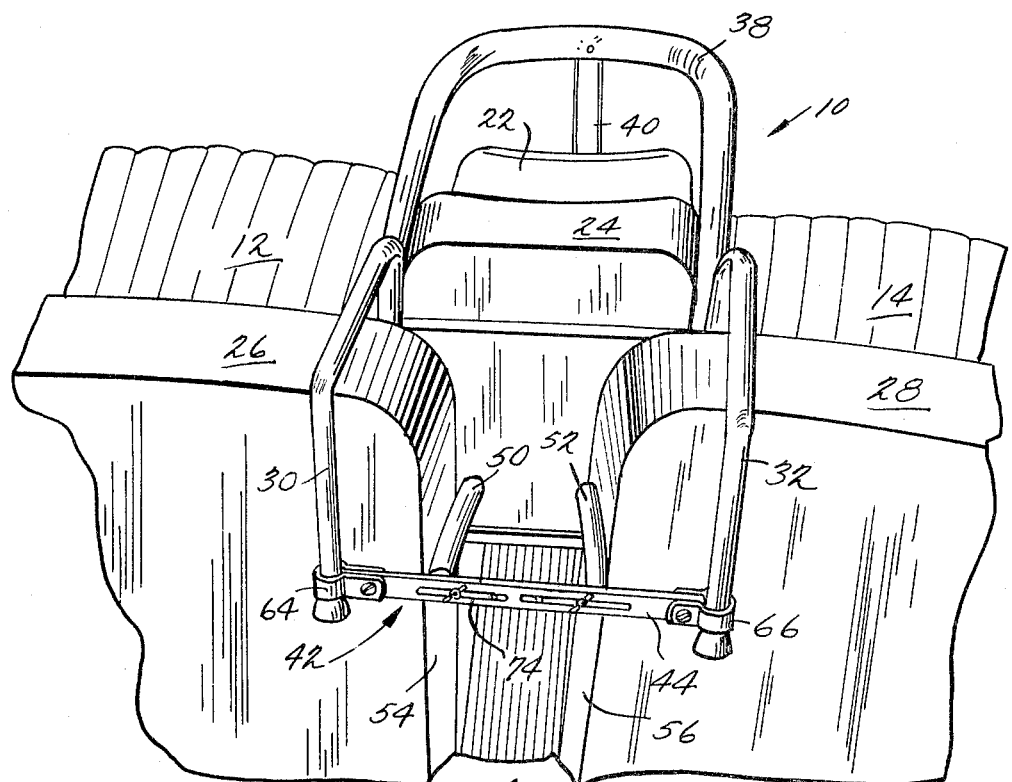
FIGURE 1 is a perspective view of a child's seat mounted between bucket seats of an automobile as seen from a rear view of the bucket seats.

As shown in FIGURE 1, the child's seat 10 of this invention is of such a size and dimension that it may be placed in bridging relationship between the two separate automobile front seats 12 and 14, which hereafter will be referred to as bucket seats. In the usual placement of bucket seats in an automobile, a space 16 is left between the two seats, and this space varies in size depending upon the manufacturer and the model of automobile. However, the space 16 is not of such a width that the ordinary child's seat will not span the space between the two bucket seats. Accordingly, the child's seat 10, as represented in the drawings, is of a standard size and shape, and the present invention resides in providing means to safely maintain the child's seat in a bridging relationship to bucket seats as found in the various automobiles being manufactured.

Referring to FIGURES 2 and 3, it can be seen that the frame of child's seat 10 includes a horizontal bottom seat portion 18 and a vertical, upright back portion 20, and the bottom 18 and back 20 are joined at essentially a right angle to form a seating area for a child placed in the seat 10. The various elements forming the frame of the seat may be made of tubular metal stock or any other acceptable material. In the usual construction the bottom and back portions 18 and 20 are provided with pads or cushions 22 and 24, respectively, which make the seat more comfortable in use. In addition, the child's seat includes some means for supporting or suspending the seat at an elevated position, so that the bottom portion 18 is high enough for the child to look out of the automobile while riding. The embodiment shown in FIGURE 1 shows the child's seat 10 suspended from the upright backs 26 and 28 of the two bucket seats by means of the two inverted U-shaped members 30 and 32 which are rigidly attached to some part of the child's seat frame. The inverted U-shaped members may be made of tubular metal stock and are of such a shape and size as to easily fit over and embrace the upright backs of the bucket seats. In an alternative construction shown in FIGURE 3, the child's seat 10 may be supported on the bucket seats by the legs 34 and 36 which are spaced far enough apart to contact the separate bucket seat bottom portions, thereby allowing the child's seat to be supported in a straddling position. Also, the usual child's seat includes a movable bar 38 around the front of the seat for holding the child in place, and a strap 40 may be connected from the bar 38 to a lower part of the seat frame. Preferably, the movable bar 38 is covered with a foam rubber material to provide further safety.

It can be readily appreciated that the above-described constructions for auxiliary seats for children are adequate in the sense of being portable and easily placed in and removed from an automobile. However, in the prior art constructions, there is no provision for preventing lateral movement of the child's seat as related to the automobile seats upon which it is placed. This becomes a special problem in the case of bucket seat automobiles because any lateral movement of the child's seat may result in a tipping or falling of one side of the child's seat into the space which is found between the two seats. The present invention includes, in a child's seat construction, an adapter member indicated generally at 42 which prevents lateral shifting of the child's seat in relation to the bucket seats.

Figure 4:
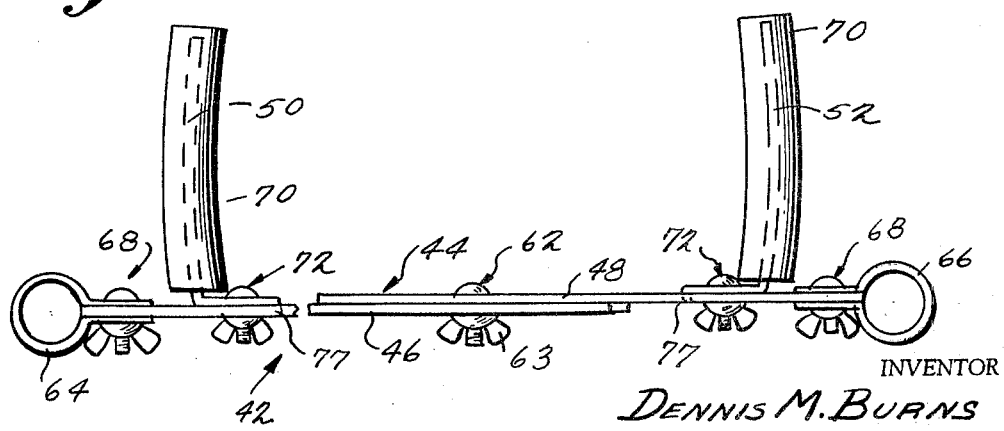
FIGURE 4 is a top view of the adapter means of this invention.

The adapter member 42 includes a cross bar 44 which may be made up of two coextensive bar elements 46 and 48 which are adjustably joined as shown in FIGURE 4. The cross bar 44 is of a sufficient total length in its expanded condition to span and bridge any contemplated spaces to be found between bucket seats in standard automobile construction, and of course, where the cross bar 44 consists of a single bar element, that element is of a sufficient length to span any space to be found between automobile bucket seats. The cross bar 44 includes two finger elements 50 and 52 which project outwardly from the cross bar at approximate right angles from the bar and in a common direction from the bar so that the fingers are essentially parallel to one another. The finger elements 50 and 52 are adapted to be inserted into the space 16 between bucket seats when a child's seat is mounted on the bucket seats, and when in place the finger elements function to contact opposed side wall portions 54 and 56 of the adjoining bucket seats. In the preferred embodiment of this invention the finger elements 50 and 52 are adjustably mounted on the bar 44 so that they may be moved toward and away from one another along the length of the bar. This feature permits a given adapter member of a child's seat to be adjusted for use with various automobiles having varying sizes of spaces between their bucket seats. The adjustment feature will be discussed below in the detailed discussion of the adapter bar itself.

The child's seat 10, as provided with the adapter member 42, may be mounted or otherwise supported in bridging relationship between two bucket seats with the finger elements 50 and 52 inserted into the space between the two adjoining bucket seats. With the child's seat in position, the finger elements are adjusted to positions where each element is in firm contact with the edge of a separate bucket seat. The finger elements are made of a material, such as metal, which permits them to stay rigid, but they are preferably covered with foam rubber or some other soft material so that they will not damage the fabric of the bucket seats when placed in firm contact with the bucket seats. When the finger elements are correctly spaced to fill the space 16 between the bucket seats, they are fixed in that position by suitable tightening means so that no further sliding movement along the cross bar 44 is possible. When these mounting steps are completed, it will be appreciated that the child's seat is held firmly in position between the two bucket seats. No lateral shifting of the child's seat can occur because of the inserted finger elements in the space 16.

Referring to the views shown in FIGURES 2 and 3, it can be seen that the adapter member 42 may be connected to a child's seat at various positions to be operative in preventing lateral shifting of the child's seat. The child's seat as shown in FIGURE 3 does not include inverted U-shaped hook members to suspend the child's seat, but relies upon the leg elements 34 and 36 to support the child's seat in a straddling position over the adjoining bucket seats. In such a construction, the adapter member 42 is connected between the upright back framing members 58 and 60, and the fingers 50 and 52 are projected rearwardly from the child's seat so as to be insertable in the space 16 between the bucket seats. As seen in FIGURE 2, this latter position of the adapter member on the child's seat is also possible in the form of a child's seat having the usual inverted U-shaped hook members. Additionally, other positions of the adapter member are contemplated as being within the scope of this invention so long as the finger elements are insertable within some part of the space found between adjoining bucket seats.

The adapter member 42 may be manufactured and sold as an article separate from a child's seat, and reference is made to FIGURE 4 where such an article is shown. When formed as a separate article, it is preferred that the adapter member include adjustment and mounting means for fitting the member to various sizes of existing children's seats. For this reason, the cross bar is preferably made up of the two bar elements 46 and 48 which are coextensive with one another and which are joined for longitudinal sliding movement of one to the other. Means may be provided to keep the bar elements in alignment with each other for all positions of adjustment, and such means may include mating ridges and grooves in the contacting surfaces of the bar elements 46 and 48. The separate bar elements 46 and 48 include slots therethrough which overlap when the bars are placed in the overlapping relationship shown, and a suitable fastening device such as wing nut and bolt assembly 62 is used to hold the two bars in overlapping relationship. The wing nut 63 may be loosened and tightened so as to permit a longitudinal sliding adjustment of the two bars, and this adjustment allows the cross bar 44 to be fitted between any existing spaced framing members of a child's seat. The terminal ends of the cross bar 44 are provided with clamping elements 64 and 66 which can be opened to grasp the usual tubular members which comprise the framing members of a child's seat. The clamping elements 64 and 66 are constructed of a spring metal material and include wing nut and bolt assemblies 68 for removing the clamping members from the terminal ends of the cross bar. When the clamping members are removed from the cross bar they may be flexed open to be placed around a framing element of a child's seat, and then the clamping member can be reconnected to the cross bar with the framing element included in the connection. Alternatively, the clamping members may be of a sectional construction as shown in FIGURE 6, and the sections 69 and 71 may be opened and closed while in position at the ends of the cross bar 44 so as to be placed around a tubular frame member.

As described earlier, one or more finger elements are placed intermediate the terminal ends of the cross bar and at right angles to the cross bar. The finger elements 50 and 52 are constructed from a rigid material, such as metal, and they are preferably covered with a foam rubber composition as at 70. The foam rubber covering may be in the form of a rubber tube which is placed over the finger element, as shown. Each finger element is shown as an L-shaped member which engages a surface of the cross bar 44 and which projects outwardly from that bar at approximately a right angle. Both fingers project outwardly in the same direction and plane from the cross bar 44, and the two finger elements are essentially parallel to each other in their positions along the cross bar. Each finger element is preferably connected to the cross bar by a suitable means which permits adjustment of the element to various positions along the length of the cross bar. Such a connection means is illustrated in FIGURE 5 in the form of a wing nut and bolt fastener 72. A slot 74 is formed through the material of the cross bar so that the finger connected by the wing nut and bolt may be held against the cross bar and moved to all positions along bar 44 as determined by the slot 74. It is important that the finger elements can be tightened in a fixed engagement with the cross bar once adjustment has been completed, and this is accomplished by tightening the wing nuts 75 onto their threaded bolts 76. Of course, when it is desired to adjust a finger element to a new position along the cross bar, the wing nut 75 is loosened from its threaded engagement with the member 76, and the finger is free to slide along the slot to a new position.

The projecting body portion of each finger element is preferably curved as shown in FIGURE 4 so that the curved fingers may be pressed into firm frictional engagement with the side walls 54 and 56 of the bucket seats. This feature permits a better fitting of the fingers to the bucket seats and aids in preventing any forward or backward movements of the child's seat. The L-shaped finger element further includes a small projecting portion 77 which is of a size to easily fit within the slot 74 formed in the cross bar 44. The projecting portion 77 maintains the engaging part of the L-shaped finger in longitudinal alignment with the cross bar 44, and prevents a twisting or pivoting of the finger elements about the axes of the bolts 76.

In an alternative construction, the finger elements may be made of tubular metal stock with internal threads formed in the end of the tubes which engage the cross bar. In such a construction, a thumbscrew is used with each finger element and is threaded so that it may be turned directly into the threaded end of the tube to effect a tightening of the tube against the cross bar.

Although this invention has been described in a preferred form wherein two finger elements are adjustably mounted on a cross bar, as described above, it is contemplated that adequate safety may be obtained with a single finger element mounted on such a cross bar. Where a single projecting means or finger element is utilized, it is preferable to make that finger of such a size that the finger nearly fills the normal space found between adjoining bucket seats. Of course, the use of a single finger element does not permit the adjustment of the adapter member to all sizes of spaces to be found between bucket seats in varying automobiles. However, it is contemplated that a single finger may be constructed of such a size as to fit the average space found in most automobile constructions. The single finger element is also covered with a foam rubber material to prevent damage to the fabric of the automobile bucket seats.

Having described the present invention, it can be seen that the child's seat and adapter means are easily handled for placement in an automobile. The adapter means adds very little bulk to the existing constructions for children's seats, and the entire assembly is easily moved into and out of a bridging position between bucket seats. Additionally, it has been shown that the adapter means may be removably mounted on a child's seat, and thus the child's seat may be adapted for use in automobiles having either bucket seats or the conventional bench seat. The adapter means may be constructed as a separate article, and, in its preferred form, it can be adjusted for connection to all existing sizes of auxiliary seats for children. As a separate article, the adapter means is easily connected and disconnected to a child's seat.

The invention has been described with reference to specific embodiments, but variations will be apparent to those skilled in the art. Such variations are within the scope of this invention as claimed below.

What is claimed is:

1. A child's seat for mounting in bridging relationship between spaced, adjoining bucket seats in an automobile, said child's seat comprising:

a horizontal base for supporting a child in a sitting position, and a vertical back support connected to said horizontal base, said child's seat being of a size to bridge the space between adjoining bucket seats in an automobile;

attachment means connected to said vertical back support for suspending said child's seat from the bucket seats in said automobile; and adapter means carried by the child's seat, said adapter means having projecting portions which can be fitted in the space between the two bucket seats to prevent lateral shifting of the child's seat when said child's seat is suspended from the bucket seats in a bridging relationship between the two bucket seats wherein said adapter means comprises a cross bar which bridges the two bucket seats, said cross bar being connected at its ends to the child's seat, and wherein said projection portions comprise two finger elements spaced from one another and projecting at right angles in the same direction from the cross bar, said two finger elements being mounted for adjustment toward and away from each other along the length of said cross bar.

2. A child's seat for mounting in bridging relationship between spaced, adjoining bucket seats in an automobile, said child's seat comprising:

a horizontal base for supporting a child in a sitting position, and a vertical back support connected to said horizontal base, said child's seat being of a size to bridge the space between adjoining bucket seats in an automobile;

attachment means connected to said vertical back support for suspending said child's seat from the bucket seats in said automobile, said attachment means comprising two inverted U-shaped elements which are connected to opposite sides of said child's seat and extending rearwardly from the child's seat so as to separately embrace the top edges of the backs of the two bucket seats when the child's seat is suspended from the two bucket seats; and adapter means carried by the child's seat, said adapter means having a projecting means which can be fitted in the space between the two bucket seats to prevent lateral shifting of the child's seat when said child's seat is suspended from the bucket seats in a bridging relationship between the two bucket seats, wherein said adapter means comprises a cross bar which bridges the two bucket seats on a face of the seats opposite to the bridging position of the child's seat, said cross bar being connected at its ends to said inverted U-shaped elements, and wherein said projecting means is carried by said cross bar for insertion between the opposed side edges of said two adjoining bucket seats.

3. A child's seat as claimed in claim 2 wherein said projecting means comprises two finger elements spaced from one another and projecting in the same direction and at right angles from the cross bar, said two finger elements being positioned on said cross bar so as to project into the space between the two adjoining bucket seats.

4. A child's seat as claimed in claim 3 wherein said two finger elements are mounted for adjustment toward and away from each other along the length of said cross bar, whereby said finger elements may be adjusted to contact the opposing side edges of two adjoining bucket seats for preventing any lateral shifting of the child's seat when said child's seat is suspended from the bucket seats.

5. A child's seat for mounting in bridging relationship between spaced, bucket seats in an automobile comprising:

a horizontal base for supporting a child in a seating position, and a vertical back support connected to said horizontal base;

adapter means carried by the child's seat, said adapter means having a projecting portion which can be fitted in the space between two bucket seats to prevent lateral shifting of the child's seat when said child's seat is mounted on the bucket seats in a bridging relationship between the two bucket seats, wherein said adapter means comprises a cross bar which bridges the two bucket seats, said cross bar being connected at its ends to the child's seat; and projecting means carried by said cross bar for insertion between the two adjoining bucket seats, said projecting means comprising two finger elements spaced from one another and projecting at right angles in the same direction from the cross bar, said two finger elements being positioned on said cross bar so as to project into the space between two adjoining bucket seats, and wherein said finger elements are mounted for adjustment toward and away from each other along the length of said cross bar, whereby said finger elements may be adjusted to contact the opposing side edges of two adjoining bucket seats for preventing any lateral shifting of the child's seat when said child's seat is placed in bridging relationship between the bucket seats.

6. An adapter means which can be connected to a child's seat for preventing lateral shifting of said child's seat when the child's seat is placed in bridging relationship between two spaced adjoining bucket seats in an automobile, said adapter means comprising:

a cross bar of sufficient length to span the space between two adjoining bucket seats, wherein said cross bar comprises two bar elements arranged coextensively, and connected to each other for adjustment whereby the length of the cross bar may be adjusted, connection means at the terminal ends of said cross bar for connecting said adapter means to a child's seat, and finger projection means carried by said cross bar for insertion into the space between two adjoining bucket seats, whereby said adapter means may be connected to a child's seat and said projection means may be inserted into the space between adjoining bucket seats when said child's seat is placed in a bridging relationship to the two bucket seats.

References Cited by the Examiner

UNITED STATES PATENTS

| 1,004,689 | 10/1911 | Raymer | 182—53 |
|---|---|---|---|
| 1,232,985 | 7/1917 | Settan | 297—250 |
| 2,446,036 | 7/1948 | Zdanaitis | 297—254 |
| 2,569,729 | 10/1951 | Nold | 297—250 |
| 2,667,913 | 2/1954 | Dustin | 297—414 |
| 2,778,556 | 1/1957 | Johnson | 182—206 |
| 2,797,037 | 6/1957 | Niedojadlo | 182—214 |
| 3,068,048 | 12/1962 | Mahon | 312—235 |
| 3,107,942 | 10/1963 | Rivkin | 297—254 |
| 3,144,272 | 8/1964 | Yadven | 297—248 |

FOREIGN PATENTS 947,132  8/1956  Germany.

J. T. McCALL, *Primary Examiner.*

FRANCIS K. ZUGEL, FRANK B. SHERRY,
*Examiners.*